(12) United States Patent
Imazu

(10) Patent No.: US 11,202,018 B2
(45) Date of Patent: Dec. 14, 2021

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Hiroo Imazu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 60 days.

(21) Appl. No.: 16/277,900

(22) Filed: Feb. 15, 2019

(65) Prior Publication Data

US 2019/0260947 A1   Aug. 22, 2019

(30) Foreign Application Priority Data

Feb. 19, 2018   (JP) .............................. JP2018-026886

(51) Int. Cl.
  *H04N 5/262*   (2006.01)
  *H04N 5/232*   (2006.01)

(52) U.S. Cl.
  CPC ....... *H04N 5/2628* (2013.01); *H04N 5/23238* (2013.01); *H04N 5/23296* (2013.01); *H04N 5/23299* (2018.08); *H04N 5/23206* (2013.01)

(58) Field of Classification Search
None
See application file for complete search history.

(56) References Cited

U.S. PATENT DOCUMENTS

| 2015/0296142 A1* | 10/2015 | Cappel-Porter | H04N 5/23238 348/37 |
| 2016/0142639 A1* | 5/2016 | Kimura | H04N 5/232945 348/240.3 |
| 2018/0160046 A1* | 6/2018 | Nash | H04N 5/23296 |
| 2018/0183982 A1* | 6/2018 | Lee | H04N 5/247 |

FOREIGN PATENT DOCUMENTS

| CN | 101924879 A | 12/2010 |
| CN | 102598652 A | 7/2012 |
| JP | 3922478 B2 | 5/2007 |
| WO | 2017/025822 A1 | 2/2017 |

* cited by examiner

*Primary Examiner* — Heather R Jones
(74) *Attorney, Agent, or Firm* — Canon U.S.A., Inc. IP Division (57) ABSTRACT

An information processing apparatus includes a second acquisition unit that acquires a second image captured by a second image capturing unit of which an image capturing area is controlled by a driving control unit, and a display control unit that clips an image of an area corresponding to a selection area from the second image acquired by the second acquisition unit, and displays the clipped image.

11 Claims, 5 Drawing Sheets

INFORMATION PROCESSING APPARATUS, INFORMATION PROCESSING METHOD, AND STORAGE MEDIUM

BACKGROUND

Field of the Disclosure

The present disclosure relates to an information processing apparatus, an information processing method, and a storage medium.

Description of the Related Art

Conventionally, there is an image capturing system that includes a wide-area camera that can capture an image of a wide area, and a pan tilt zoom (PTZ) camera that includes a pan mechanism, a tilt mechanism, and a zoom mechanism.

Japanese Patent No. 3922478 discusses a remote-controlled panhead control apparatus that includes a television camera capable of performing PTZ operation, and a confirmation camera that can capture an image of an entire image capturing range of the television camera. When a specific capturing position among a plurality of image capturing positions of the television camera is designated, the remote-controlled panhead control apparatus extracts an image that corresponds to an image capturing area for image capturing by the television camera set at the designated image capturing position, from an image captured by the confirmation camera. The remote-controlled panhead control apparatus displays the extracted image on a display screen.

As the image capturing system including the wide-area camera and the PTZ camera, there is one type that has a function of driving the PTZ camera to capture an image of a selection area selected from a wide-area image by a user, and displaying the image captured by the PTZ camera as an enlarged image of the selection area.

However, for this type of image capturing system, there is such an issue that a misalignment occurs between the selection area in the wide-area image and the display area of the enlarged image. The misalignment occurs due to factors such as a distance from the camera to an object, an optical-axis misalignment between the wide-area camera and the PTZ camera, and the accuracy of PTZ driving control for the PTZ camera. In a case where the misalignment occurs between the selection area and the display area, it takes time for the user to select the area from the wide-area image again in order to obtain desired display, and besides, such an operation is troublesome. Moreover, if the display area and the selection area are different, there is a possibility that an object that is a monitoring target is not included in the display area and thus the user loses sight of the object.

Japanese Patent No. 3922478 discusses a related technology, but mentions nothing about a misalignment between the image extracted from the image captured by the confirmation camera and the image captured by the television camera.

SUMMARY

Accordingly, in a case where a captured image of an area corresponding to a selection area within an image is displayed, it is desirable to inhibit a misalignment between the selection area and a display area.

According to an aspect of the present disclosure, an information processing apparatus includes a first acquisition unit configured to acquire area information indicating a selection area concerning a first image captured by a first image capturing unit, a second image capturing unit configured to capture a second image by performing image capturing for an image capturing range narrower than an image capturing range of the first image capturing unit, a driving control unit configured to control an image capturing area of the second image capturing unit to include an area corresponding to the selection area in the image capturing area of the second image capturing unit, based on the area information acquired by the first acquisition unit, a second acquisition unit configured to acquire the second image captured by the second image capturing unit of which the image capturing area is controlled by the driving control unit, and a display control unit configured to clip an image of the area corresponding to the selection area from the second image acquired by the second acquisition unit, and display the clipped image.

Further features of the present disclosure will become apparent from the following description of exemplary embodiments with reference to the attached drawings.

DESCRIPTION OF THE EMBODIMENTS

Exemplary embodiments of the present disclosure will be described in detail below with reference to the attached drawings.

Figure 1:
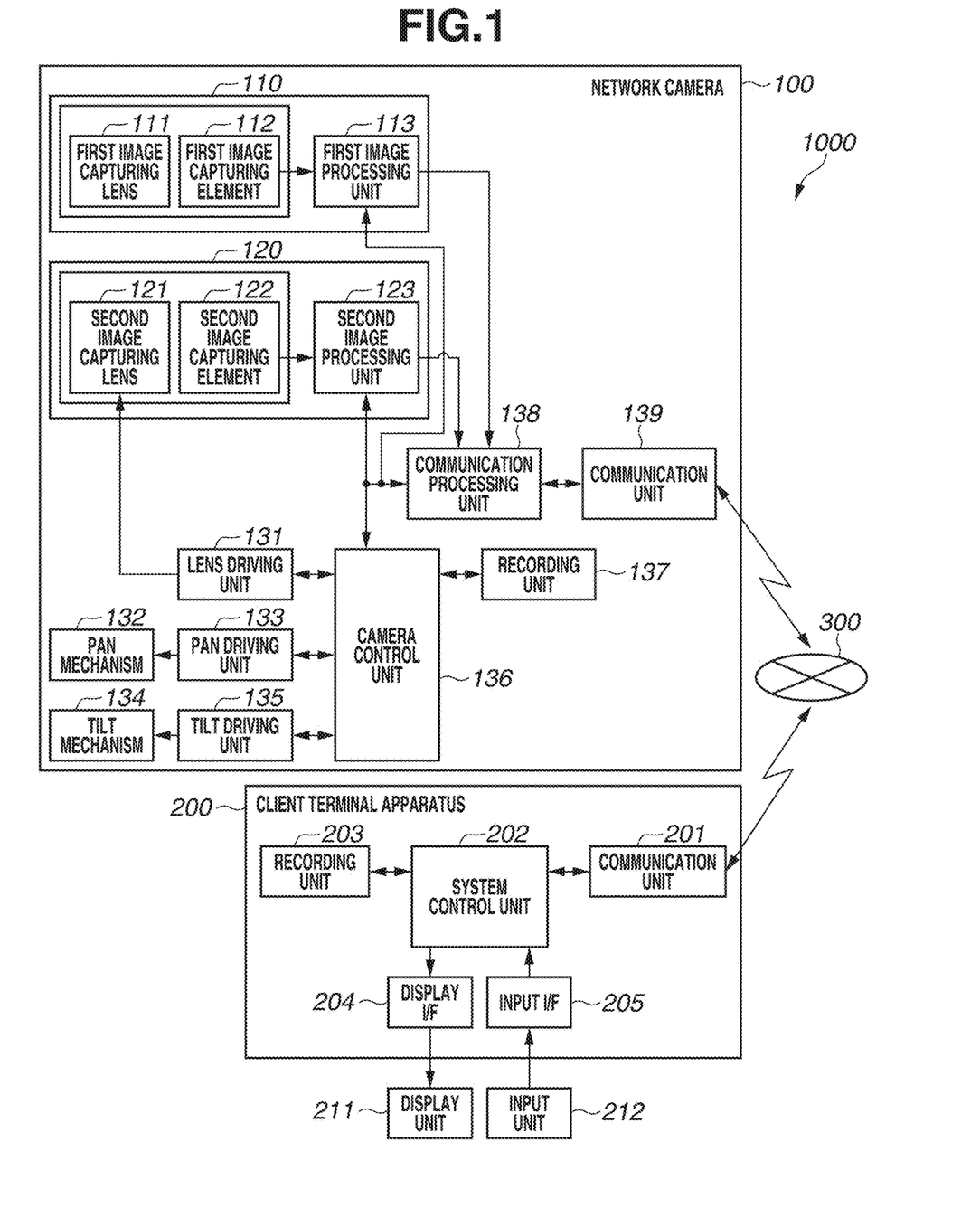
FIG. 1 is a block diagram illustrating a configuration example of an image capturing system according to one or more aspects of the present disclosure.

Each of the exemplary embodiments to be described below is an example serving as a way of implementing the present disclosure, and may be modified or altered as appropriate depending on a configuration and various conditions of an apparatus to which the present disclosure is applied. The present disclosure is not limited to the following exemplary embodiments, FIG. 1 is a block diagram illustrating an outline of a configuration example of an image capturing system 1000 according to a first exemplary embodiment.

The image capturing system 1000 according to the present exemplary embodiment can be a monitoring system that monitors a wide monitoring area. The image capturing system 1000 presents a first image of a wide area to a user. The image capturing system 1000 receives setting of a selection area within the first image, and presents to the user an enlarged image of the selection area set by the user.

In the present exemplary embodiment, the image capturing system 1000 includes a wide-area camera that captures the first image of the wide area, and a pan tilt zoom (PTZ) camera that captures a second image of an area narrower than the area of the first image. The image capturing system 1000 acquires the second image captured by the PTZ camera, by controlling an image capturing area of the PTZ camera to include an area corresponding to the selection area in the image capturing area of the PTZ camera. The image capturing system 1000 clips an image of the area corresponding to the selection area from the second image, and presents the clipped image to the user as an enlarged image of the selection area.

This can appropriately inhibit a misalignment between the selection area selected from the first image by the user and the display area of the enlarged image captured by the PTZ camera.

The image capturing system 1000 includes a network camera (hereinafter simply referred to as "camera") 100 serving as an image capturing apparatus, and a client terminal apparatus 200 serving as a display apparatus. The camera 100 and the client terminal apparatus 200 are connected by a network 300 to be able to communicate with each other. The network 300 can be a network such as a local area network (LAN), the Internet, or a wide area network (WAN). If the network 300 has a configuration that enables communications between the camera 100 and the client terminal apparatus 200, the network 300 may adopt any type of communication standard, scale, and configuration. In addition, a physical configuration of connection to the network 300 may be wired or may be wireless.

The camera 100 is a multiple lens camera, and includes a first image capturing unit 110 and a second image capturing unit 120. The first image capturing unit 110 includes a first image capturing lens 111, a first image capturing element 112, and a first image processing unit 113. The second image capturing unit 120 includes a second image capturing lens 121, a second image capturing element 122, and a second image processing unit 123.

The camera 100 further includes a lens driving unit 131, a pan mechanism 132, a pan driving unit 133, a tilt mechanism 134, a tilt driving unit 135, a camera control unit 136, a recording unit 137, a communication processing unit 138, and a communication unit 139.

The first image capturing unit 110 functions as the wide-area camera that captures the first image of the wide area. The image capturing range of the first image capturing unit 110 can be, for example, the entire monitoring area. In other words, the first image can be, for example, a captured image obtained by performing image capturing for the entire monitoring area. The image capturing direction and the viewing angle of the first image capturing unit 110 may be fixed or may be variable.

The first image capturing lens 111 is a lens unit that forms an image capturing optical system. The first image capturing element 112 includes a component such as a charge coupled device (CCD) or a complementary metal oxide semiconductor (CMOS). The first image capturing element 112 converts an object image formed by the first image capturing lens 111 into an electrical signal (an image capturing signal) and outputs the electrical signal. The first image processing unit 113 generates image data, by performing image processing for the image capturing signal output from the first image capturing element 112. Examples of the image processing include noise removal processing, gain adjustment processing, A/D conversion processing, color conversion processing, gamma correction processing, and pixel interpolation processing.

The second image capturing unit 120 captures the second image of the area narrower than the area of the first image. The image capturing range of the second image capturing unit 120 can be narrower than the image capturing range of the first image capturing unit 110. The second image can be, for example, a captured image obtained by performing image capturing for a part of the monitoring area.

The second image capturing lens 121, the second image capturing element 122, and the second image processing unit 123 are similar to the first image capturing lens 111, the first image capturing element 112, and the first image processing unit 113 of the first image capturing unit 110, respectively, in terms of configuration. However, the configuration of the second image capturing lens 121 is different from the configuration of the first image capturing lens 111 in that an optical zoom function is provided.

The second image capturing unit 120 is supported by the pan mechanism 132 and the tilt mechanism 134, and configured to change the image capturing direction to each of a pan direction and a tilt direction.

The camera control unit 136 has a microcomputer, and performs control of the operation of the camera 100 by executing a program stored in the recording unit 137. Specifically, the camera control unit 136 performs control such as control of the first image processing unit 113 and the second image processing unit 123, and control of the lens driving unit 131, the pan driving unit 133, and the tilt driving unit 135.

The camera control unit 136 can freely change the viewing angle of the second image capturing unit 120, by controlling the lens driving unit 131 to drive the optical zoom of the second image capturing lens 121. Further, the camera control unit 136 can change the image capturing direction of the second image capturing unit 120 to the pan direction, by controlling the pan driving unit 133 to drive the pan mechanism 132. Furthermore, the camera control unit 136 can change the image capturing direction of the second image capturing unit 120 to the tilt direction, by controlling the tilt driving unit 135 to drive the tilt mechanism 134. In other words, the second image capturing unit 120 functions as the PTZ camera that can adjust a pan/tilt position and a zooming factor.

In this way, the camera 100 has the first image capturing unit 110 serving as the wide-area camera, and the second image capturing unit 120 serving as the PTZ camera.

Further, the camera control unit 136 can analyze a command received from the client terminal apparatus 200 via the communication unit 139, and perform processing based on the command. Specifically, the camera control unit 136 can capture an image at a PTZ position requested by the client terminal apparatus 200, and output the captured image to the communication unit 139 to transmit the captured image to the client terminal apparatus 200.

The recording unit 137 has a memory such as a semiconductor memory. The recording unit 137 is used as a buffer for processing by the first image processing unit 113 and the second image processing unit 123, and as a storage device for a program to be executed by the camera control unit 136.

The communication processing unit 138 performs compression and encoding of an image output from each of the first image processing unit 113 and the second image processing unit 123, and outputs image data obtained by the compression and encoding.

The communication unit 139 delivers the image data output from the communication processing unit 138, via the network 300.

The communication unit 139 provides a wireless or wired communication interface with an external device. Examples of the wireless communication include a wireless personal area network (PAN) that employs a technology such as Bluetooth (registered trademark), Z-Wave (registered trademark), ZigBee (registered trademark), of ultra-wide band (UWB). The examples of the wireless communication further include a wireless LAN employing a standard such as wireless fidelity (Wi-Fi, registered trademark), and a wireless metropolitan area network (MAN) employing a standard such as Worldwide Interoperability for Microwave Access (WiMAX, registered trademark). The examples of the wireless communication further include a wireless WAN employing a standard such as Long-Term Evolution 3G (LTE/3G).

The communication unit 139 may communicate with an external device by a wired LAN. Examples of the wired LAN include a configuration including a plurality of routers, switches, and cables that meet a communication standard such as Ethernet (registered trademark). The communication standard, scale, and configuration of the communication unit 139 are not limited to the above-described examples, if the communication unit 139 can communicate with an external device.

The client terminal apparatus 200 can designate a PTZ position for the camera 100, and receive an image captured at the designated PTZ position from the camera 100. The client terminal apparatus 200 can display the received image.

The client terminal apparatus 200 includes a communication unit 201, a system control unit 202, a recording unit 203, a display interface (I/F) 204, and an input I/F 205.

The communication unit 201 transmits and receives data to and from the camera 100 via the network 300. The data transmitted to and received from the camera 100 includes the above-described PTZ position and the captured image obtained by image capturing using the camera 100. The communication unit 201 may have a configuration similar to the configuration of the communication unit 139 of the camera 100.

The system control unit 202 performs the control of the operation of the entire client terminal apparatus 200.

The recording unit 203 has areas such as an area for temporary storage of data (e.g., the captured image) received by the client terminal apparatus 200 via the communication unit 201, and a work area to be used by the system control unit 202 when the system control unit 202 executes various kinds of processing. The recording unit 203 also stores setting data of the client terminal apparatus 200 and a boot program.

The display I/F 204 is an interface for connecting a display unit 211 to the client terminal apparatus 200. An image or character to be displayed at the display unit 211 is sent to the display unit 211 via the display I/F 204. The display unit 211 includes a monitor such as a liquid crystal display, and can display the result of processing by the client terminal apparatus 200, using an image or information such as a character. The display unit 211 displays, for example, a graphical user interface (GUI).

The input I/F 205 is an interface for connecting an input unit 212 to the client terminal apparatus 200. An operation instruction provided by the input unit 212 is notified to the system control unit 202 via the input I/F 205. The input unit 212 includes a pointing device such as a keyboard or a mouse, and the user can operate the input unit 212 to operate the GUI. The device to be used for providing the operation instruction to the GUI is not limited to the input unit 212 and may be another type of input device.

Figure 2:
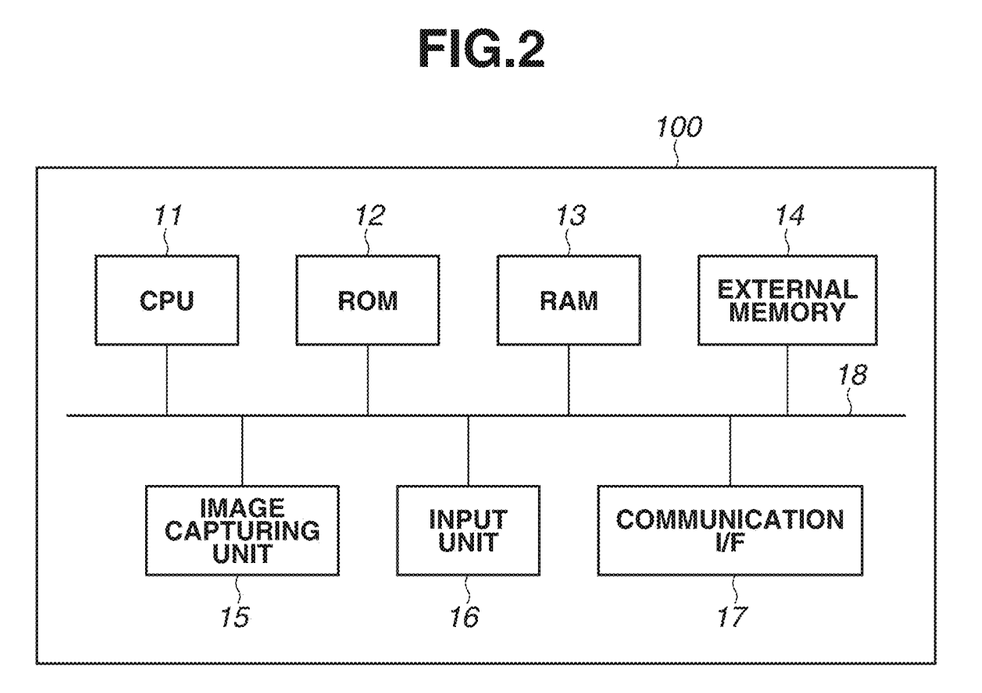
FIG. 2 is a block diagram illustrating an example of a hardware configuration of a network camera.

FIG. 2 is a hardware configuration example of the camera 100.

As illustrated in FIG. 2, the camera 100 includes a central processing unit (CPU) 11 (a first acquisition unit, a second acquisition unit, a driving control unit, correspondence unit, a display control unit, a third acquisition unit), a read only memory (ROM) 12, a random access memory (RAM) 13, an external memory 14, an image capturing unit 15, an input unit 16, a communication I/F 17, and a system bus 18. The CPU 11 performs overall control of operation in the camera 100, and controls each of configuration units (12 to 17) via the system bus 18. The ROM 12 is a nonvolatile memory that stores a program such as a control program necessary for the CPU 11 to execute processing. The program may be stored in the external memory 14 or a removable storage medium (not illustrated). The RAM 13 functions as a main memory and a work area of the CPU 11. In other words, when executing processing, the CPU 11 loads a necessary program into the RAM 13 from the ROM 12, and implements various kinds of function operation by executing the program.

The external memory 14 stores, for example, various kinds of data and various kinds of information that are necessary when the CPU 11 performs processing using a program. The external memory 14 also stores, for example, various kinds of data and various kinds of information obtained by the processing performed using the program by the CPU 11. The image capturing unit 15 includes the first image capturing unit 110 and the second image capturing unit 120 in FIG. 1. The input unit 16 has components such as a power supply button and various setting buttons, and the user can input various instructions to the camera 100 by operating the input unit 16. The communication I/F 17 corresponds to the communication unit 139 in FIG. 1.

A part or all of the function of each element of the camera 100 in FIG. 1 can be implemented by execution of a program by the CPU 11. However, at least one of the elements of the camera 100 in FIG. 1 may operate as a piece of dedicated hardware. In this case, the piece of dedicated hardware operates based on control of the CPU 11.

As for the client terminal apparatus 200, a hardware configuration corresponding to the display unit 211 in FIG. 1 is provided in place of the image capturing unit 15. Further, as for the client terminal apparatus 200, a hardware configuration corresponding to the input unit 212 in FIG. 1 is provided as the input unit 16, and a hardware configuration corresponding to the communication unit 201 in FIG. 1 is provided as the communication I/F 17. A part or all of the function of each element of the client terminal apparatus 200 in FIG. 1 can be implemented by execution of a program by a CPU of the client terminal apparatus 200 corresponding to the CPU 11. However, at least a part of the function of each element of the client terminal apparatus 200 in FIG. 1 may operate as a piece of dedicated hardware. In this case, the piece of dedicated hardware operates based on control of the CPU.

Figure 3:
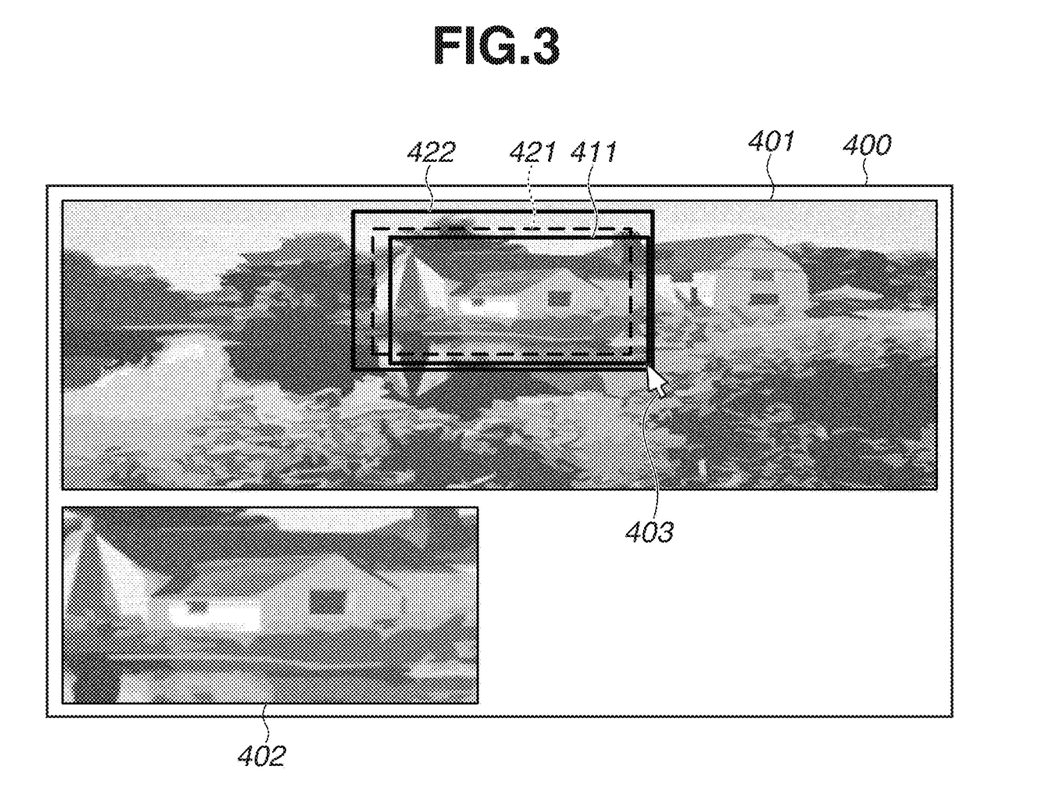
FIG. 3 illustrates an example of a graphical user interface (GUI).

FIG. 3 is a diagram illustrating an example of a GUI 400 displayed at the display unit 211.

The GUI 400 is provided with display areas 401 and 402 each for displaying an image. The user operates the GUI 400 using the input unit 212, and the system control unit 202 performs display control for the GUI 400 based on a user operation.

The first image captured by the first image capturing unit 110 is displayed in the display area 401.

The user can move a mouse pointer 403 within the display area 401, by operating the mouse of the input unit 212. The mouse pointer 403 is used to set the selection area within the first image captured by the first image capturing unit 110, within the display area 401 on the GUI 400. The method for setting the selection area is not limited to the method using the mouse. The selection area may be set by another method such as direct input of a numerical value from the keyboard.

When the user sets the selection area within the first image by operating the mouse, the enlarged image of the selection area is displayed in the display area 402. The image displayed in the display area 402 is the image clipped from the second image captured by the second image capturing unit 120. The camera 100 acquires area information indicating the selection area set on the GUI 400 by the user, and captures the second image by controlling the second image capturing unit 120 based on the acquired information. The camera 100 clips the image from the second image and display the clipped image in the display area 402 on the GUI 400.

For the case where the enlarged image of the selection area is displayed in the display area 402, there is a method for capturing an image by controlling pan/tilt driving and zoom driving so that an image of an area corresponding to the selection area is captured by the second image capturing unit 120, and displaying the captured image in the display area 402.

However, a misalignment may occur between the selection area set by the user and the image capturing area of the second image capturing unit 120. Examples of a cause of the misalignment include a distance to an object, an optical-axis misalignment between the first image capturing unit 110 and the second image capturing unit 120, and the accuracy of control of PTZ driving of the second image capturing unit 120. For example, in a case where the user selects a selection area 411 within the first image in the GUI 400 in FIG. 3, the second image capturing unit 120 is controlled to perform image capturing for an area corresponding to the selection area 411. However, the image capturing area of the second image capturing unit 120 can be an area corresponding to an area 421 indicated by a broken line.

In this case, the captured image of the area different from the area corresponding to the selection area 411 is displayed in the display area 402, and a misalignment occurs between the selection area 411 and the display area 402. It takes time for the user to reset the selection area in the first image in order to change the display of the display area 402 to desired display, and besides, such an operation is troublesome. In addition, if the display area 402 and the selection area 411 are different, there is a possibility that the object that is a monitoring target is not included in the display area 402 and thus the user loses sight of the object.

It is conceivable that calibration may be performed to eliminate the misalignment between the selection area 411 and the display area 402. In this case, however, performing the calibration takes time and effort and thus is troublesome for the user. Moreover, even if the calibration is performed, it is difficult to completely eliminate the misalignment due to a factor such as the accuracy of the control of the PTZ driving for the PTZ camera.

Therefore, in the present exemplary embodiment, in order to inhibit the above-described misalignment, the camera 100 acquires the second image captured by the second image capturing unit 120, by controlling the image capturing area of the second image capturing unit 120 to include the area corresponding to the selection area 411 in the image capturing area of the second image capturing unit 120. The camera 100 clips the area corresponding to the selection area from the second image, and performs display control for displaying the clipped image in the display area 402 of the GUI 400.

Specifically, the camera 100 acquires the central coordinates and the size of the selection area in the first image, as area information indicating the selection area. The camera 100 also acquires correspondence information indicating a correspondence between coordinates in the first image and the image capturing direction of the second image capturing unit 120, and a correspondence between the size of an area in the first image and a viewing angle of the second image capturing unit 120. The camera 100 controls the image capturing direction of the second image capturing unit 120 to be the image capturing direction corresponding to the central coordinates of the selection area, and controls the viewing angle of the second image capturing unit 120 to be a viewing angle wider than the viewing angle corresponding to the size of the selection area, based on the acquired information. In other words, in a case where the user sets the selection area 411 within the first image, the camera 100 controls the pan/tilt driving and the zoom driving so that the second image capturing unit 120 captures an image of an area corresponding to an area 422 that is larger than the area 421 in FIG. 3. The area 422 includes the entire selection area 411.

Further, the camera 100 compares the second image obtained by performing image capturing for an area corresponding to the area 422 by the second image capturing unit 120, and the image of the selection area 411 in the first image. The camera 100 clips an image matching the image of the selection area 411 from the second image, and displays the clipped image in the display area 402. This inhibits the misalignment between the selection area 411 and the display area 402.

A frame line indicating the selection area 411 may be displayed only when the user sets the selection area 411 and may not be displayed afterward. A frame line indicating each of the area 421 and the area 422 is illustrated for the purpose of the above description, and may not be displayed on the real GUI 400.

In the present exemplary embodiment, the case is described where the camera 100 operates as an information processing apparatus that controls the image capturing area of the second image capturing unit 120, clips the image of the area corresponding to the selection area from the second image captured by the second image capturing unit 120, and displays the clipped image. However, the camera 100 may be configured to have only a part of the function of the information processing apparatus. Furthermore, for example, the client terminal apparatus 200 may have a part or all of the function of the information processing apparatus, or another apparatus may have a part or all of the function of the information processing apparatus.

Next, the operation of the camera 100 in the present exemplary embodiment be described.

Figure 4:
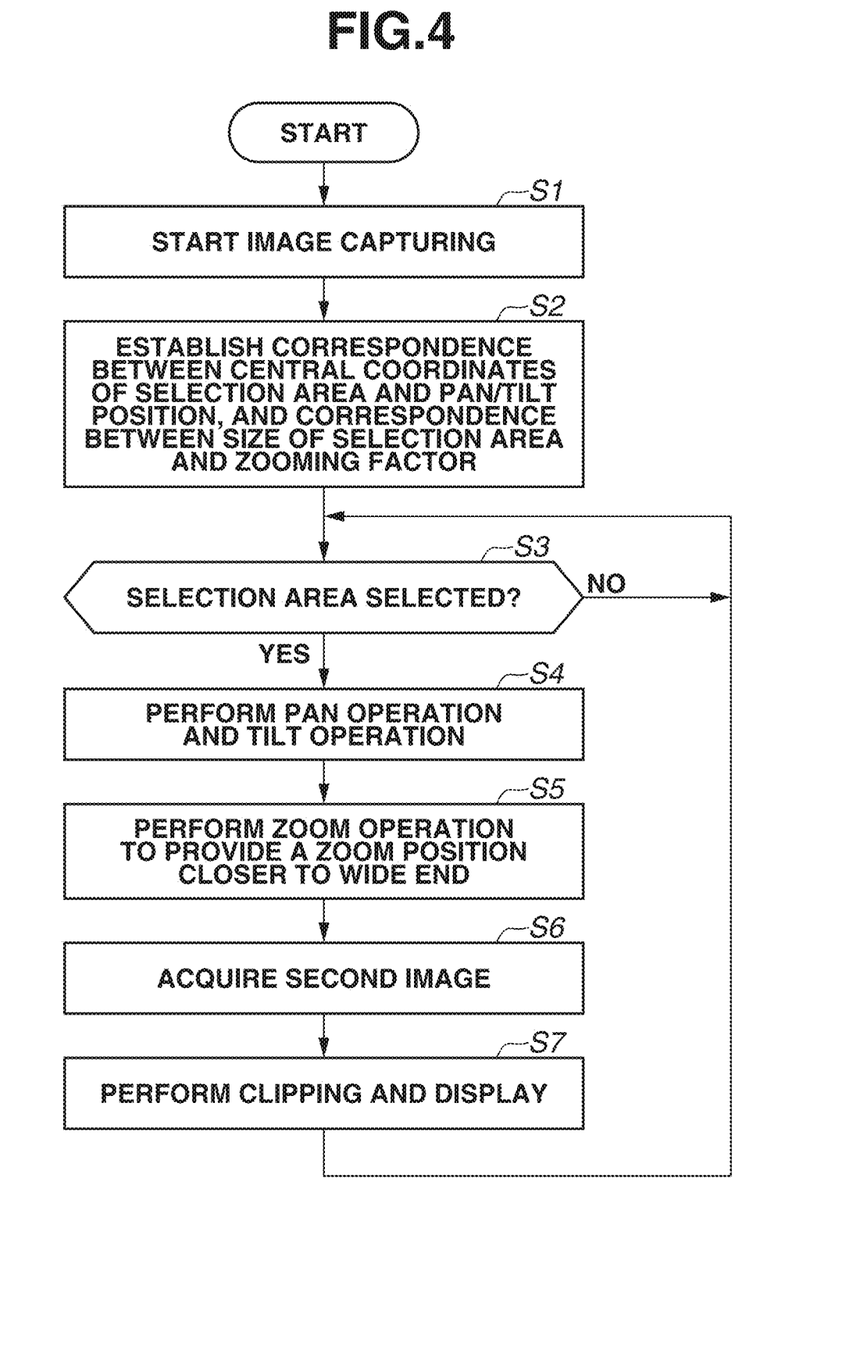
FIG. 4 is a flowchart illustrating operation according to one or more aspects of the present disclosure.

FIG. 4 is a flowchart illustrating an example of image clipping display processing to be executed by the camera 100. For example, the processing in FIG. 4 starts when the user operates a setting screen displayed at the client terminal apparatus 200. However, the timing of the start of the processing in FIG. 4 is not limited to the example.

The camera 100 can implement the processing in FIG. 4 by readout of a necessary program and execution of the read-out program by the CPU 11. However, the processing in FIG. 4 may be implemented by the operation of at least one of the elements of the camera 100 in FIG. 1 as a piece of dedicated hardware. In this case, the piece of dedicated hardware operates based on control of the CPU 11.

First, in step S1, the camera 100 starts image capturing by controlling the first image capturing unit 110 and the second image capturing unit 120. The camera 100 also performs display control for displaying the first image captured by the first image capturing unit 110 in the GUI 400 of the client terminal apparatus 200.

Next, in step S2, the camera 100 establishes the correspondence between the coordinates in the first image captured by the first image capturing unit 110 and the image capturing direction of the second image capturing unit 120. In addition, the camera 100 establishes the correspondence between the size of the area in the first image captured by the first image capturing unit 110 and the viewing angle of the second image capturing unit 120. Specifically, the camera 100 establishes the correspondence between the coordinates of a point in the first image, and a pan/tilt position of the second image capturing unit 120 when the image capturing direction of the second image capturing unit 120 is adjusted to the direction of the point. Further, the camera 100 establishes the correspondence between the size of the area in the first image and a zooming factor of the second image capturing unit 120 when the viewing angle of the second image capturing unit 120 is adjusted to a viewing angle corresponding to the area.

As a result, the correspondence information indicating the correspondence between the central coordinates of the selection area within the first image and the pan/tilt position of the second image capturing unit 120 is obtained. Further, the correspondence information indicating the correspondence between the size of the selection area within the first image and the zooming factor of the second image capturing unit 120 is obtained. A table that stores these two kinds of correspondence information may be prepared beforehand, and the table may be saved in the recording unit 137.

In step S3, the camera 100 determines whether the selection area is selected by the user, in the first image displayed on the GUI 400. Specifically, the camera 100 receives the setting of the selection area within the first image, and determines whether the area information indicating the selection area is acquired from the client terminal apparatus 200 via the network 300. If the area information indicating the selection area is not acquired from the client terminal apparatus 200, the camera 100 determines that the selection area is not selected by the user (NO in step S3), and repeats the determination in step S3. If the camera 100 determines that the selection area is selected by the user (YES in step S3), the processing proceeds to step S4. Here, the area information indicating the selection area includes the central coordinates and the size of the selection area in the first image.

In step S4, the camera 100 determines a target value of the pan/tilt position of the second image capturing unit 120, by referring to the correspondence information obtained in step S2, based on the area information indicating the selection area. Specifically, the camera 100 acquires the pan/tilt position of the second image capturing unit 120 of the correspondence established in step S2, based on the central coordinates of the selection area. The camera 100 determines the acquired pan/tilt position as the target value of the pan/tilt position of the second image capturing unit 120. Further, the camera 100 performs the pan operation and the tilt operation of the second image capturing unit 120, by controlling the pan driving unit 133 and the tilt driving unit 135.

In step S5, the camera 100 determines a target value of the zooming factor of the second image capturing unit 120, by referring to the correspondence information obtained in step S2, based on the area information indicating the selection area. Specifically, the camera 100 acquires a zooming factor of the correspondence established in step S2, based on the size of the selection area. The camera 100 determines a zooming factor providing a closer zoom position to the wide end than the acquired zooming factor, as the target value. In the following description, the zooming factor derived based on the correspondence information will be referred to as "the reference value of the zooming factor", and the zooming factor providing a closer zoom position to the wide end than the zooming factor derived based on the correspondence information will be referred to as "the target value of the zooming factor".

For example, in a case where the reference value of the zooming factor is 6 times, the target value of the zooming factor is, for example, 4 times, that is a value determined by multiplying the reference value by a predetermined constant smaller than 1.

The predetermined constant is not limited to a fixed value. The higher the zooming factor is, the larger the amount of a misalignment with respect to the viewing angle is. Therefore, the above-described constant may be set so that the larger the reference value of the zooming factor, the smaller the value to which the above-described constant may be changed so that a zoom position closer to the wide end can be determined. In other words, the target value of the zooming factor may be set at 10 times, in a case where the reference value of the zooming factor is 20 times. Further, the target value of the zooming factor may be set at 4 times, in a case where the reference value of the zooming factor is 6 times.

Upon completing the determination of the target value of the zooming factor, the camera 100 performs the zoom operation of the second image capturing unit 120, by controlling the lens driving unit 131.

In step S6, the camera 100 acquires the second image captured by the second image capturing unit 120. In step S7, the camera 100 compares the image of the selection area in the first image captured by the first image capturing unit 110 and the second image captured by the second image capturing unit 120 acquired in step S6, and clips the image of an area corresponding to the selection area from the second image. The image clipped from the second image matches the image of the selection area, in terms of viewing angle. Here, for example, a scheme such as template matching can be used for the method for comparing the image of the selection area and the second image. The method for comparing the images is not limited to the above-described method, and another type of method for comparing images may be used.

Upon clipping the image corresponding to the selection area from the second image, the camera 100 performs the display control for displaying the clipped image at the client terminal apparatus 200. The client terminal apparatus 200 displays the clipped image as the enlarged image of the selection area on the GUI of the display unit 211.

Here, the camera 100 may clip the image corresponding to the selection area from the second image, and immediately display the clipped image at the client terminal apparatus 200. Alternatively, the camera 100 may gradually display the clipped image. In other words, the camera 100 may clip images from the second image while gradually narrowing the viewing angle up to the clipped image corresponding to the selection area, and may display the clipped images sequentially at the client terminal apparatus 200. This prevents the user from feeling strange.

The amount of a misalignment between the central coordinates of the second image and the central coordinates of the clipped image is equivalent to a misalignment amount in the correspondence between the central coordinates of the selection area of the first image and the pan/tilt position. Therefore, the correspondence information indicating the correspondence between the central coordinates of the selection area of the first image and the pan/tilt position may be corrected, by grasping the above-described amount of misalignment by repeating the processing from step S3 to step S7 several times. The correspondence information reflecting the above-described amount of misalignment can be thereby acquired, and an effect similar to the effect of the calibration is obtained. Further, in this case, because the amount of lowering the scale factor of the target value of the zooming factor with respect to the reference value of the zooming factor can be reduced, the resolution of the image clipped from the second image can be increased.

As described above, the camera 100 in the present exemplary embodiment includes the first image capturing unit 110 that acquires the first image of the wide area, and the second image capturing unit 120 that acquires the second image of the area narrower than the area of the first image. The second image capturing unit 120 is configured to adjust the pan/tilt position and the zooming factor. Furthermore, the camera 100 includes the pan driving unit 133 and the tilt driving unit 135 that perform the pan/tilt driving of the second image capturing unit 120, and the lens driving unit 131 that performs the zoom driving of the second image capturing unit 120. Further, the camera 100 can perform the display control for displaying at the client terminal apparatus 200 the first image captured by the first image capturing unit 110 and the second image captured by the second image capturing unit 120, in order to present these images to the user.

When the user selects a partial area in the first image displayed at the client terminal apparatus 200, the camera 100 receives the setting of the selection area, and acquires information about the central coordinates and the size of the selection area, as the area information indicating the selection area. In this process, the camera 100 acquires the second image, by controlling the PTZ driving of the second image capturing unit 120 so that the image capturing area of the second image capturing unit 120 includes the area corresponding to the selection area, based on the area information indicating the selection area. The camera 100 clips the image of the area corresponding to the selection area from the second image, and performs the display control for displaying the clipped image at the client terminal apparatus 200 as the enlarged image of the selection area.

Specifically, the camera 100 establishes the correspondence between the coordinates of the point in the first image and the pan/tilt position of the second image capturing unit 120. The camera 100 controls the pan/tilt driving so that the image capturing direction of the second image capturing unit 120 is adjusted to the direction corresponding to the center of the selection area, based on the central coordinates of the selection area. In addition, the camera 100 establishes the correspondence between the size of the area in the first image and the zooming factor of the second image capturing unit 120. The camera 100 controls the zoom driving so that the viewing angle of the second image capturing unit 120 is adjusted to a viewing angle wider than the viewing angle corresponding to the selection area, based on the size of the selection area.

Further, the camera 100 compares the second image and the image of the selection area within the first image, and clips the image of the area corresponding to the viewing angle equivalent to the viewing angle of the image of the selection area, from the second image. The camera 100 displays the clipped image at the client terminal apparatus 200.

In this way, when performing image capturing for the selection area in a wide-area image (the first image) using the PTZ camera, the camera 100 captures a PTZ image (the second image) by bringing the optical zoom to a wider angle than the reference value. Furthermore, the camera 100 compares the image of the selection area in the wide-area image and the PTZ image, and clips the image of an area corresponding to the selection area from the PTZ image, using electronic zooming. The camera 100 displays the clipped image.

Therefore, it is possible to combine the selection area selected from the wide-area image by the user and the display area clipped from the PTZ image. Because the misalignment between the selection area and the display area is inhibited, it is not necessary for the user to select the selection area again to obtain desired display, so that time and effort can be reduced. Moreover, the user can be prevented from losing sight of an object that is a monitoring target.

Modification

In the present exemplary embodiment, the case has been described where the target value of the zooming factor is determined by multiplying the reference value of the zooming factor by the predetermined constant. However, the target value of the zooming factor may be determined based on a distance from the second image capturing unit 120 to an object in focus. In this case, the camera 100 executes image clipping display processing in FIG. 5.

Figure 5:
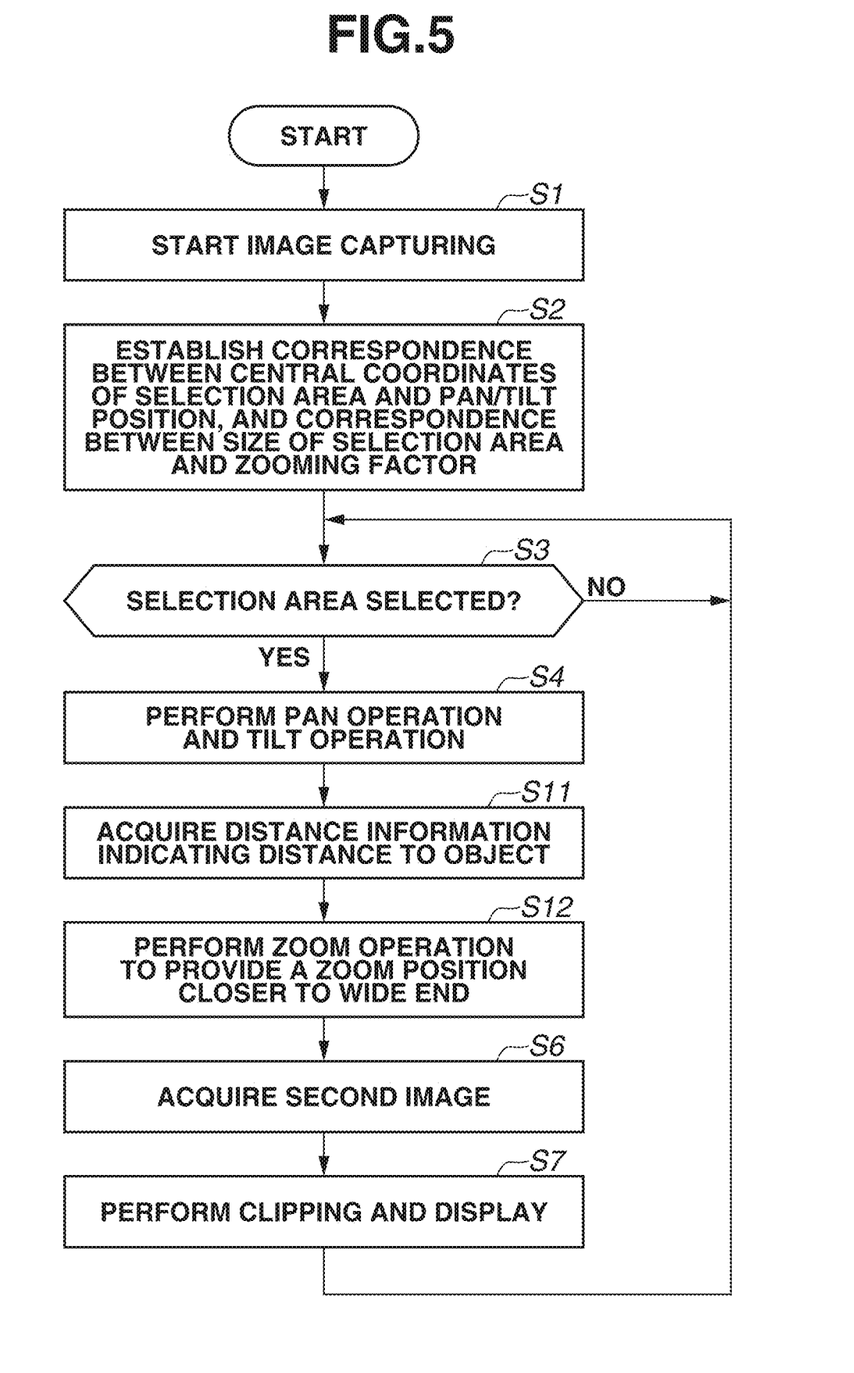
FIG. 5 is a flowchart illustrating another operation according to one or more aspects of the present disclosure.

The processing in FIG. 5 is different from the processing in FIG. 4 in that step S11 and step S12 are provided. In FIG. 5, a step similar to the step in FIG. 4 is provided with a step number that is the same as the step number in FIG. 4, and the different part will be described below.

In step S11, the camera 100 acquires the reference value of the zooming factor of the second image capturing unit 120, by referring to the correspondence information obtained in step S2, based on the information indicating the size of the selection area in the first image. The camera 100 then performs auto focus (AF) operation in the image capturing area corresponding to the reference value of the zooming factor, and thereby acquires distance information indicating a distance from the second image capturing unit 120 to an object in focus.

In step S12, the camera 100 determines the target value of the zooming factor based on the distance information acquired in step S11, and performs the zoom operation. For example, the camera 100 may set the target value of the zooming factor, such that the longer the distance to the object is, the closer to the reference value of the zooming factor the target value of the zooming factor is, whereas the shorter the distance to the object is, the more appropriate to provide a closer zoom position to the wide end than the reference value of the zooming factor the target value of the zooming factor is. Alternatively, the camera 100 may set the target value of the zooming factor, such that the longer the distance to the object is, the more appropriate to provide a closer zoom position to the wide end than the reference value of the zooming factor the target value of the zooming factor is, whereas the shorter the distance to the object is, the closer to the reference value of the zooming factor the target value of the zooming factor is.

In this way, the distance to the object may be acquired by the AF operation, and the amount of a change of the zooming factor may be changed such that the zoom position is closer to the wide end, depending on the distance to the object. The second image capturing unit 120 can be thereby appropriately controlled so that the zoom position of the second image capturing unit 120 is appropriately moved, and the image capturing area of the second image capturing unit 120 includes the area corresponding to the selection area, even if the amount of the misalignment changes because of the distance to the object.

Further, in the present exemplary embodiment, the case has been described where the first image capturing unit 110 is configured such that the first image of the wide area is captured using the one image capturing unit. However, the first image capturing unit 110 may include a plurality of image capturing units. In this case, the plurality of image capturing units included in the first image capturing unit 110 performs image-capturing by sharing an image capturing range (e.g., the entire monitoring area), so that a panorama image can be acquired as the first image, by combining a plurality of images captured by the plurality of image capturing units.

Furthermore, in the present exemplary embodiment, the case has been described where the second image capturing unit 120 is configured such that the second image of the area narrower than the area of the first image is captured using the one image capturing unit. However, the second image capturing unit 120 may include a plurality of image capturing units. In this case, the second image may be captured by switching the plurality of image capturing units from one to another, depending on the position of the selection area in the first image. In addition, in the case where the second image capturing unit 120 includes the plurality of image capturing units, a case where a plurality of selection areas is selected in the first image can also be supported.

Further, in the present exemplary embodiment, the case has been described where the camera 100 is the multiple lens camera that includes the first image capturing unit 110 and the second image capturing unit 120. However, the image capturing unit that captures the first image and the image capturing unit that captures the second image may be provided in different image capturing apparatuses. In this case, one of the plurality of image capturing apparatuses may operate as an information processing apparatus that controls the PTZ driving of the image capturing apparatus that captures the second image, and controls the clipping and the display of the second image. Further, an apparatus (device) different from the plurality of image capturing apparatuses may operate as the information processing apparatus.

Furthermore, in the present exemplary embodiment, the case has been described where the camera 100 controls the PTZ driving of the second image capturing unit 120, by establishing the correspondence between the coordinates in the first image and the pan/tilt position of the second image capturing unit 120, and the correspondence between the size of the area in the first image and the zooming factor of the second image capturing unit 120. However, if the camera 100 can control the PTZ driving of the second image capturing unit 120 so that the image capturing area of the second image capturing unit 120 includes the area corresponding to the selection area, the method for determining each of the pan/tilt position and the zooming factor is not limited to the above-described case.

For example, the first image may be divided into a plurality of division areas, and the camera 100 may determine which one of the division areas of the first image includes the selection area. The camera 100 may determine the image capturing area of the second image capturing unit 120 to capture an image of the determined division area including the selection area. In other words, it is not necessary to control the pan/tilt position and the zooming factor of the second image capturing unit 120, corresponding to the central coordinates and the size of the selection area.

Other Exemplary Embodiments

The present disclosure can also be implemented by supplying a program that implements one or more functions of the above-described exemplary embodiment to a system or apparatus via a network or storage medium, and causing one or more processors in a computer of the system or apparatus to execute processing by reading out the program. The present disclosure can also be implemented by a circuit (e.g., an application-specific integrated circuit (ASIC)) for implementing one or more functions.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2018-026886, filed Feb. 19, 2018, which is hereby incorporated by reference herein in its entirety.

What is claimed is:

1. An information processing apparatus comprising:
a first acquisition unit configured to acquire area information indicating a selection area in a first image captured by a first image capturing unit;
a second image capturing unit configured to capture a second image by performing image capturing for an image capturing range narrower than an image capturing range of the first image capturing unit;
a driving control unit configured to control an image capturing area of the second image capturing unit based on the area information acquired by the first acquisition unit, such that the second image capturing unit captures an area which includes an entire area of the selection area in the first image and which has a size larger than a size of the selection area; and a control unit configured to clip an image of an area equivalent to the selection area from the second image captured by the second image capturing unit of which the image capturing area has been controlled by the driving control unit, for displaying the clipped image at a client apparatus, wherein the control unit compares, by using template matching, an image of the selection area in the first image captured by the first image capturing unit and the second image captured by the second image capturing unit of which the image capturing area has been controlled by the driving control unit, and clips the image of the area equivalent to the selection area from the second image captured by the second image capturing unit of which the image capturing area has been controlled by the driving control unit.

2. The information processing apparatus according to claim 1, further comprising a correspondence unit configured to acquire correspondence information indicating a correspondence between coordinates of a point in the first image and a pan/tilt position of the second image capturing unit when an image capturing direction of the second image capturing unit is adjusted to a direction corresponding to the point, and correspondence information indicating a correspondence between a size of an area in the first image and a zooming factor of the second image capturing unit when a viewing angle of the second image capturing unit is adjusted to a viewing angle corresponding to the area, wherein the second image capturing unit is configured to adjust the pan/tilt position and the zooming factor, wherein the first acquisition unit acquires information about central coordinates and a size of the selection area, as the area information indicating the selection area, and wherein the driving control unit controls the second image capturing unit, based on the information about the central coordinates and the size of the selection area acquired by the first acquisition unit, and the correspondence information acquired by the correspondence unit.

3. The information processing apparatus according to claim 2, wherein the driving control unit controls the pan/tilt position of the second image capturing unit to be a pan/tilt position corresponding to the central coordinates of the selection area based on the correspondence information, and controls the zooming factor of the second image capturing unit to be a zooming factor that attains a wider viewing angle than the zooming factor corresponding to the size of the selection area based on the correspondence information.

4. The information processing apparatus according to claim 2, wherein the correspondence unit acquires the correspondence information that reflects an amount of a misalignment between central coordinates of the clipped image in the second image and central coordinates of the second image, as the correspondence information indicating the correspondence between the coordinates of the point in the first image and the pan/tilt position of the second image capturing unit.

5. The information processing apparatus according to claim 1, further comprising an output unit configured to output the first image to the client apparatus, wherein the first acquisition unit receives setting of the selection area within the first image displayed at the client apparatus, and acquires the area information indicating the selection area.

6. The information processing apparatus according to claim 1, wherein the first image capturing unit includes a plurality of image capturing units that perform image capturing by sharing an image capturing range, and wherein the first image is a panoramic image that is a combination of a plurality of images captured by the respective plurality of image capturing units.

7. The information processing apparatus according to claim 1, further comprising a third acquisition unit configured to acquire distance information indicating a distance from the second image capturing unit to an object, wherein the driving control unit controls a size of the image capturing area of the second image capturing unit, based on the distance information acquired by the third acquisition unit.

8. The information processing apparatus according to claim 7, wherein the second image capturing unit includes a focusing unit, and wherein the third acquisition unit acquires a distance to an object brought into focus by the focusing unit, as the distance information.

9. An image capturing apparatus comprising:

the information processing apparatus according to claim 1;

the first image capturing unit configured to capture the first image; and the second image capturing unit configured to capture the second image.

10. An information processing method comprising:

acquiring area information indicating a selection area in a first image captured by a first image capturing unit;

controlling an image capturing area of a second image capturing unit based on the area information, such that the second image capturing unit captures an entire area which includes an entire area of the selection area in the first image and which has a size larger than a size of the selection area, wherein the second image capturing unit captures a second image by performing image capturing for an image capturing range narrower than an image capturing range of the first image capturing unit;

comparing, by using template matching, an image of the selection area in the first image captured by the first image capturing unit and the second image captured by the second image capturing unit of which the image capturing area has been controlled in the controlling; and clipping an image of an area equivalent to the selection area from the second image captured by the second image capturing unit of which the image capturing area has been controlled in the controlling, for displaying the clipped image at a client apparatus.

11. A non-transitory computer readable storage medium storing a program for implementing an information processing method by an image capturing apparatus, the method comprising:

acquiring area information indicating a selection area in a first image captured by a first image capturing unit;

controlling an image capturing area of a second image capturing unit based on the area information, such that the second image capturing unit captures an entire area which includes an entire area of the selection area in the first image and which has a size larger than a size of the selection area, wherein the second image capturing unit captures a second image by performing image capturing for an image capturing range narrower than an image capturing range of the first image capturing unit;

comparing, by using template matching, an image of the selection area in the first image captured by the first image capturing unit and the second image captured by the second image capturing unit of which the image capturing area has been controlled in the controlling; and clipping an image of an area equivalent to the selection area from the second image captured by the second image capturing unit of which the image capturing area has been controlled in the controlling, for displaying the clipped image.

\* \* \* \* \*